United States Patent
Saitoh

[11] Patent Number: 5,742,717
[45] Date of Patent: Apr. 21, 1998

[54] OPTICAL STAR COUPLER

[75] Inventor: Tetsuya Saitoh, Tokyo, Japan

[73] Assignee: Fuji Electric Co., Ltd., Tokyo, Japan

[21] Appl. No.: 613,071

[22] Filed: Mar. 8, 1996

[30] Foreign Application Priority Data

Oct. 30, 1995 [JP] Japan ................................ 7-281941

[51] Int. Cl.⁶ ............................................... G02B 6/26
[52] U.S. Cl. ........................................ 385/46; 385/47
[58] Field of Search .......................... 385/39, 46, 47, 385/34

[56] References Cited

U.S. PATENT DOCUMENTS

| | | | |
|---|---|---|---|
| 3,874,781 | 4/1975 | Thiel | 385/46 |
| 4,285,570 | 8/1981 | Minemura et al. | 385/46 |
| 4,365,864 | 12/1982 | Cowley et al. | 385/46 |
| 5,469,277 | 11/1995 | Kavehrad et al. | 385/46 X |

FOREIGN PATENT DOCUMENTS

| | | |
|---|---|---|
| 0299159 | 1/1989 | European Pat. Off. . |
| 2659005 | 4/1982 | Germany . |
| 3324161 | 1/1985 | Germany ................ 385/46 |
| 3723170 | 4/1989 | Germany . |
| 59-079216 | 5/1984 | Japan . |
| 59-126510 | 7/1984 | Japan ................... 385/46 |
| 62-66210 | 3/1987 | Japan ................... 385/46 |
| 2058390 | 4/1981 | United Kingdom . |

*Primary Examiner*—John D. Lee
*Attorney, Agent, or Firm*—Brumbaugh, Graves, Donohue & Raymond

[57] ABSTRACT

An optical star coupler that distributes the optical signal radiated from an optical fiber uniformly across the mixing means and couples the distributed optical signal efficiently to the other optical fibers. The optical star coupler includes: a bundling means including a plurality of optical fibers, the ends thereof being bundled, a flat plane formed by polishing the end faces of the optical fibers, and a light reflector formed on a part of the flat plane; a mixing means including a waveguide, the first end face thereof contacting with the flat plane and wide enough to cover the cores of the optical fibers; and a diffuser-reflector means arranged on the second end face of the waveguide.

4 Claims, 5 Drawing Sheets

OPTICAL STAR COUPLER

TECHNICAL FIELD

The present invention relates to an optical star coupler which couples a number of optical fibers, one of which carries an optical signal which is to be coupled to the other optical fibers with a low transmission loss. The coupler can also gather optical signals to be placed on one optical fiber with a low transmission loss.

BACKGROUND OF THE INVENTION

Figure 5A:
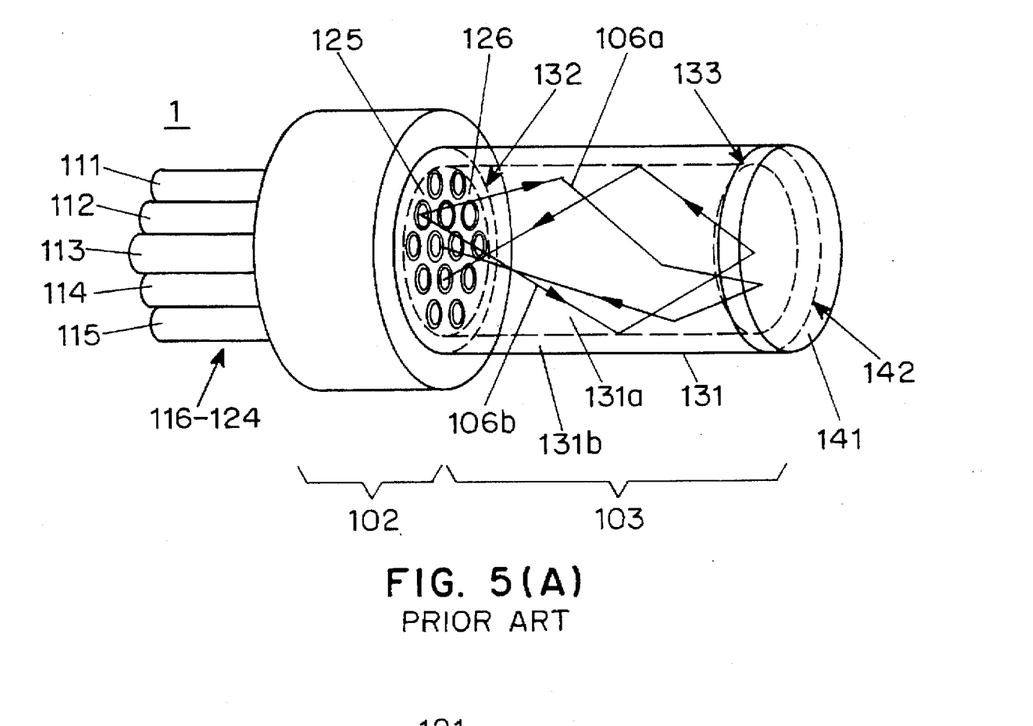
FIG. 5(A) is a schematic structure of a conventional optical star coupler.
Figure 5B:
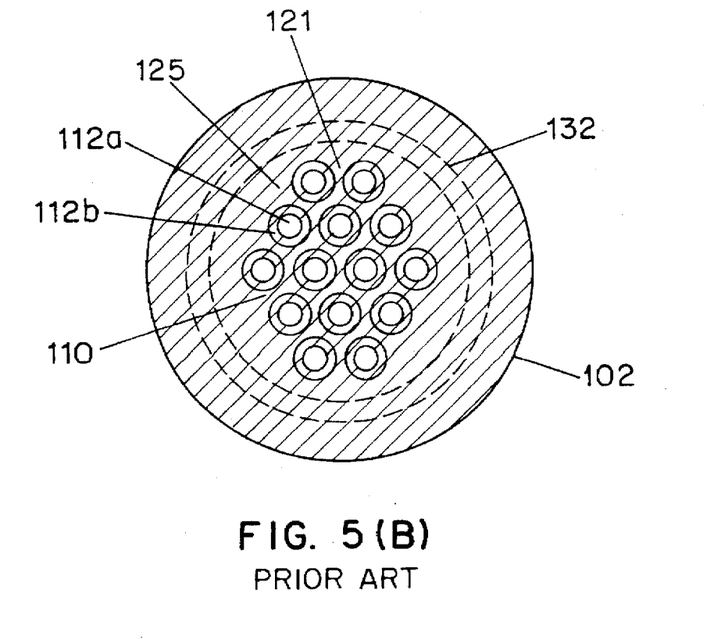
FIG. 5(B) is a side plan view of the conventional optical star coupler of FIG. 5(A)

It is often necessary when constructing an optical transmission network to use an optical star coupler that distributes an optical signal to a plurality of optical fibers and gathers a plurality of optical signals to be placed on one optical fiber. These type of optical star couplers are disclosed in the Japanese Unexamined Laid Open Patent Application (Koukai) No. S59-126510 and U.S. Pat. No. 4,365,864. FIGS. 5(A) and 5(B) show a conventional optical star coupler whose relevant parts to the present invention are indicated and arranged for the sake of explanation.

Referring now to FIGS. 5(A) and 5(B), a plurality of optical fibers 111 through 115 and 116 through 124 (not shown) (hereinafter the optical fibers are designated by 111 through 124) is fixed with the first ends thereof bundled to the conventional optical star coupler. The bundled first ends of the optical fibers 111 through 124 are arranged so as to form a flat end face 125. A light reflector 126 is disposed on a part of the end face 125. The bundled first ends of the optical fibers 111 through 124, the end face 125 and the light reflector 126 constitute a bundling means (or bundling portion) 102. A mixing means (or mixing portion) 103 includes a waveguide 131 whose first end face 132 contacts the end face 125 of the bundling means 102, and the first end face of the waveguide 131 is wide enough to cover the cores 111a through 124a of the optical fibers 111 through 124. A terminal mirror 141 is disposed on the second end face 133 of the mixing means (or mixing portion) 103. The terminal mirror 141 has a reflection plane 142.

In the structure shown in FIGS. 5(A) and 5(B), the end face 125 of the bundling means 102 is bonded to the first end face 132 of the mixing means 103. The mixing means 103 comprises a transparent cylindrical optical glass rod. The terminal mirror 141 is bonded to the second end face 133, which is on the opposite end of the mixing means 103 facing the first end face 132. The waveguide 131 of the mixing means 103 consists of a cylindrical core 131a and a cladding 131b formed on the side face of the cylindrical core 131a. The refractive index of the cladding 131b is set lower than that of the core 131a.

In the conventional optical star coupler of FIGS. 5(A) and 5(B), optical signals 106a, 106b radiate, for example, from the optical fiber 112 and diverge across the waveguide 131. A portion of the diverging optical signals propagate through the mixing means 103 while being totally reflected by the peripheral surface of the mixing means 103 and reaches the terminal mirror 141. Then, the optical signals 106a, 106b, reflected by the terminal mirror 141, propagate back through the waveguide 131 to the optical fibers 111 through 124. The optical signals 106a, 106b which have reached the cores 111a through 124a of the optical fibers 111 through 124 are output through the optical fibers.

In the illustrated conventional optical star coupler of the Japanese Unexamined Laid Open Patent Application (Koukai) No. S59-126510, as shown in FIGS. 5A and 5b, the terminal mirror 141 having an optical reflecting means (reflection plane 142) is formed on the second end face 133 of the mixing means 103. Another optical reflecting means (reflection plane 127) is formed on a space 110 extending between the cores 111a through 124a of the optical fibers 111 through 124. The space 110 covers the end faces of the cladding 111b through 124b of the optical fibers 111 through 124. For example, an optical signal radiated from the optical fiber 112 is reflected at the reflection plane 142 and diverges almost uniformly over the entire end face 125 when the mixing means 103 is sufficiently long. The optical signal incident to the cores 111a through 124a is output through of the optical fibers 111 through 124 in the form which it reaches the cores. The incident optical signal to the space 110, inclusive of the claddings 111b through 124b, is reflected repeatedly by the reflection planes 127 and 142 until finally outputted. As a result, an optical signal radiated from the optical fiber 112 is distributed to the other optical fibers.

Another conventional optical star coupler disclosed in U.S. Pat. No. 4,365,864, which will also be described referring to FIGS. 5A and 5b, has a reflection mirror that corresponds to the terminal mirror 141. An aperture mirror having apertures thereon corresponds to the light reflector 126 formed on a part of the end face 125. The optical signals 106a, 106b are radiated from the cores 111a through 124a of the optical fibers 111 through 124 to the mixing means 103 through the apertures of the aperture mirror. The optical signals 106a, 106b radiating, for example, from the optical fiber 112 to the mixing means 103 are reflected by the reflection plane 142 and diverge almost uniformly over the end face 125. The incident optical signal to the cores 111a through 124a is output through the optical fibers 111 through 124. The incident optical signal to the space 110, inclusive of the clads 111b through 124b, is reflected repeatedly by the reflection planes 127 and 142 and output finally. As a result, an optical signal radiated from the optical fiber 112 is distributed to the other optical fibers. The aperture mirror is formed on the end face 125 of the bundling means 102 or on the first end face 132 of the mixing means 103.

Figure 6A:
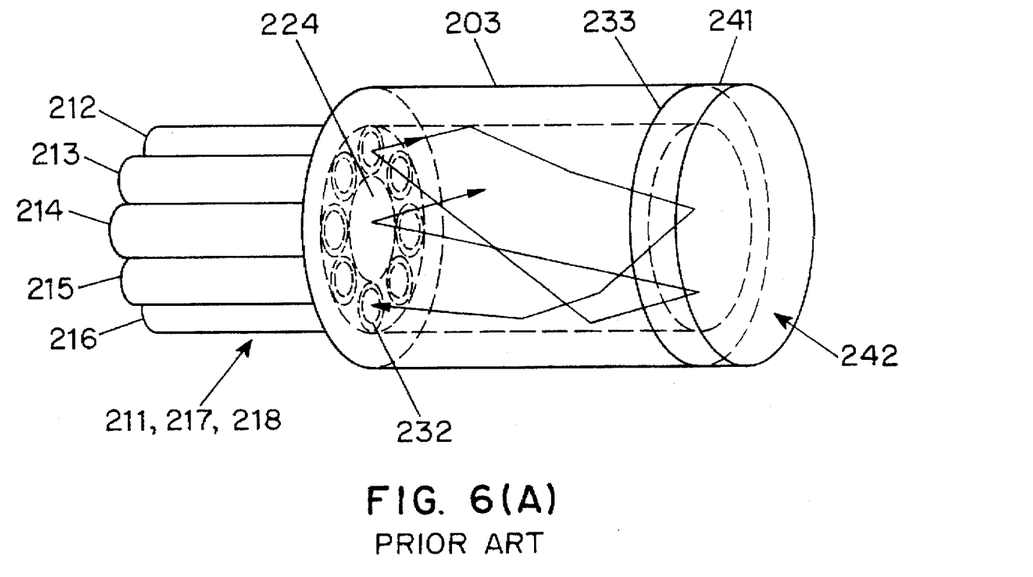
FIG. 6(A) is a schematic structure of another conventional optical star coupler.
Figure 6B:
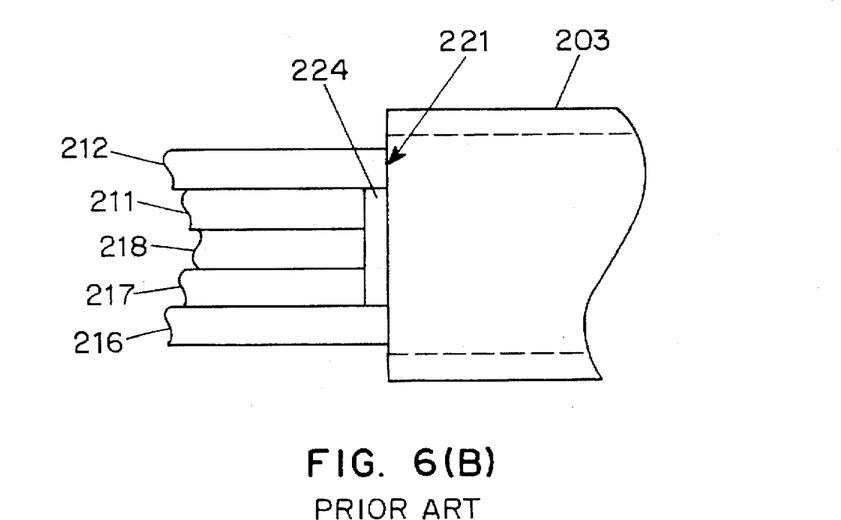
FIG. 6(B) is a cross section of the conventional optical star coupler of FIG. 6(A).

The dimensions of the mixing means 103 are properly chosen so that the optical signals 106a, 106b, radiating to the waveguide 131 and reflected at the reflection plane 142, may diverge uniformly over the end face 125. However, it has been found experimentally that the light intensity tends to be lower in the central part of the mixing means 103. FIGS. 6(A) and 6(B) show another conventional optical star coupler that solves the above described problem. In contrast to the optical star coupler of FIGS. 5(A) and 5(B), optical fibers are not located in the central part of the mixing means 203 where the reflected light intensity tends to be lower, but a circular mirror 224 is arranged in the central part of the mixing means 203. In other words, a plurality of optical fibers 211 through 218, arranged and bundled into a cylindrical tube, is bonded to the first end face 232 of the mixing means 203. The circular mirror 224 is formed on the first end face 232 of the mixing means 203 and inside the tubular bundle of the optical fibers 211 through 218. A terminal mirror 241, having its reflection plane 242, is formed on the second end face 233 of the mixing means 203. An optical signal radiating, for example from the optical fiber 212, propagates through the mixing means 203 while diverging and is reflected by the terminal mirror 241 back to the optical fibers 211 through 218. The light which has reached the cores 211a through 218a of the optical fibers 211 through 218 is output through the optical fibers. The light which has reached the circular reflection mirror 224 is reflected again and propagates back and forth across the mixing means 203.

In the conventional optical star couplers described above, the intensity of the light, radiated from an optical fiber and propagating through the mixing means, distributes in rotation symmetry in most cases around the central axis of the mixing means 203 on the cross section parallel to the end faces of the mixing means. The light intensity is weaker in the central part and stronger in the peripheral part of the mixing means. Therefore, when an optical fiber bundle that simply bundles a plurality of optical fibers is used, the intensity of light distributed to each optical fiber is different from fiber to fiber.

To equalize the intensity of light distributed to each of the optical fibers, one possible arrangement is one that arranges the optical fibers in a circle around from the central axis of the mixing means, each a certain distance from the central axis. However, the optical fibers and the mixing means should be specifically arranged with respect to one another within a narrow positional tolerance so that the light intensity divide ratio may be same for each optical fibers. That is, the optical fibers and the mixing means should be positioned quite accurately.

If a gap is left between the circular mirror and each optical fiber, the light that has reached the gap from the mixing means is radiated outside the optical fibers to cause transmission loss. In the same way, any light that has happened to enter the cladding of the optical fibers through the gap has no chance to propagate through the optical fibers, and transmission loss will be caused. The loss is hazardous for efficient utilization of the optical signals.

In view of the foregoing, it is an object of the invention to provide an optical star coupler that distributes the optical signal radiated from an optical fiber uniformly across the mixing means and couples the distributed optical signal efficiently to the other optical fibers.

SUMMARY OF THE INVENTION

According to an aspect of the present invention, there is provided an optical star coupler that includes: a bundling portion including a plurality of optical fibers, the first ends thereof being bundled and the faces of the first ends being formed to be a flat plane; a mixing portion including a waveguide, the first end face thereof contacting with the flat plane of the bundling portion and being wide enough to cover the cores of the optical fibers; and a diffuser-reflector portion arranged on the second end face of the waveguide.

In the configuration of the present invention, the incident optical signal light radiated from the bundling portion to the mixing portion is diffused and reflected at the diffuser-reflector portion arranged at the second end face of the waveguide. The optical signal light is diffused and reflected in a predetermined intensity distribution, and the reflected optical signal light distributes uniformly on the first end face of the waveguide. Thus, the distribution ratios of the light radiated from an optical fiber and the incident light to the other optical fibers do not deviate so much from one another even when each optical fibers are displaced to some extent from the mixing portion.

According to one embodiment of the present invention, the waveguide is a graded-index optical waveguide, the refractive index of which is set higher around the central axis of the waveguide.

It is preferable to set the distance between the first and second end faces of the waveguide at a value that fixes the exit position of a ray on the second end face of the waveguide in response to the incident direction of the ray to the first end face of the waveguide.

In this configuration, the optical signal light, radiated from either one of the optical fibers, propagates while being refracted, and reaches the light diffusion layer. The optical signal light enters the light diffusion layer at a position and in a propagation direction determined by the position of the optical fiber from which the optical signal light is radiated and the incident direction of the optical signal light to the waveguide. Then, the optical signal light is diffused in the light diffusion layer, reflected by the terminal mirror, diffused again in the light diffusion layer, and radiated back into the waveguide. The optical signal light radiated into the graded-index optical waveguide propagates through the waveguide and reaches the first end face of the waveguide. The position, which the optical signal light reaches, distributes in various locations on the first end face of the waveguide depending on the re-entrant direction of the optical signal light to the waveguide. Thus, the optical signal light is distributed uniformly on the flat plane of the bundling means. The uniformly distributed optical signal light then enters the optical fibers.

By setting the distance between the first and second end faces of the waveguide at a value that fixes the exit position of a ray on the second end face of the waveguide in response to the incident direction of the ray to the first end face of the waveguide, the reflected light from the terminal mirror is diffused and radiated to the graded-index optical waveguide in all the directions within the predetermined angle range, and is propagated to all the positions on the first end face of the waveguide which is facing opposite to the flat plane of the bundling means. When the diffuser-reflector portion has a uniform diffusion power for the diffused and reflected light, the light of uniform intensity may be distributed to all the optical fibers. A light reflector may be formed on the flat plane of the bundling means.

The light reflector may be formed on the entire area, except the end faces of the cores of the optical fibers, of the flat plane which the mixing means contacts at the first end face of the waveguide thereof.

The diffuser-reflector portion may preferably include a terminal mirror and a transparent light diffusion layer formed between the second end face of the waveguide and the reflection plane of the terminal mirror. The light diffusion layer preferably comprises volume holograms. The diffuser-reflector position may alternatively include a terminal mirror with minute uneven facets formed on the face of the terminal mirror which contacts that the mixing portion.

The diffuser-reflector portion may also comprise minute uneven facets and a reflection plane both formed on the second end face of the waveguide.

By these configurations, the optical light signal that had once failed to enter the optical fibers is reflected repeatedly by the light reflector of the bundling portion and the terminal mirror until the optical light signal finally enters the optical fibers.

BRIEF DESCRIPTION OF THE DRAWINGS

Further objects, features and advantages of the invention will become apparent from the following detailed description taken in conjunction with the accompanying drawings showing the preferred embodiments of the invention, in which.

DESCRIPTION OF A PREFERRED EMBODIMENT

Figure 1A:
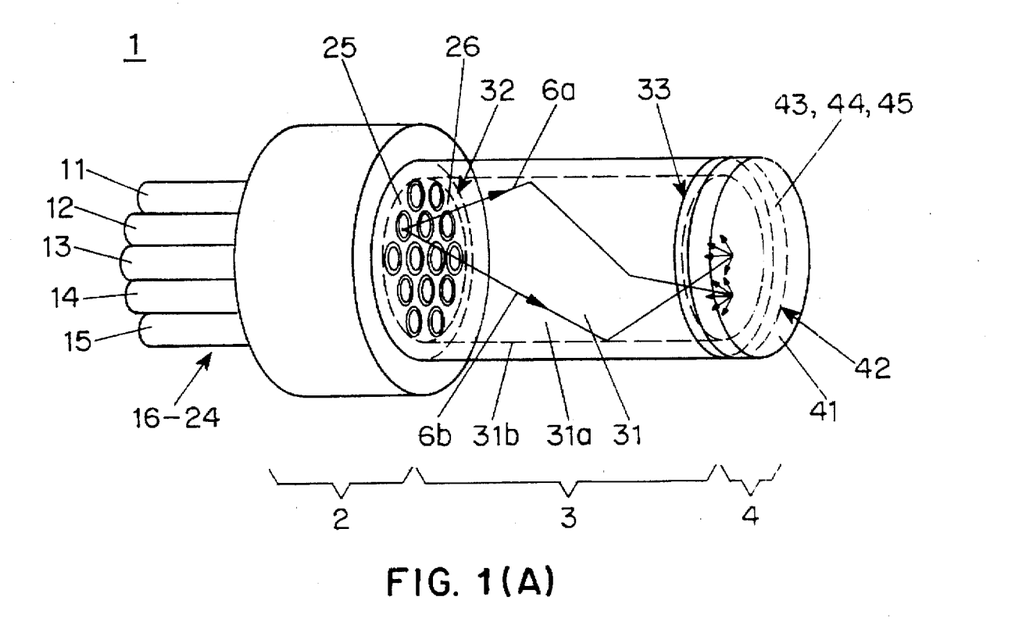
FIG. 1(A) is a schematic structure of an embodiment of an optical star coupler according to the present invention.
Figure 1B:
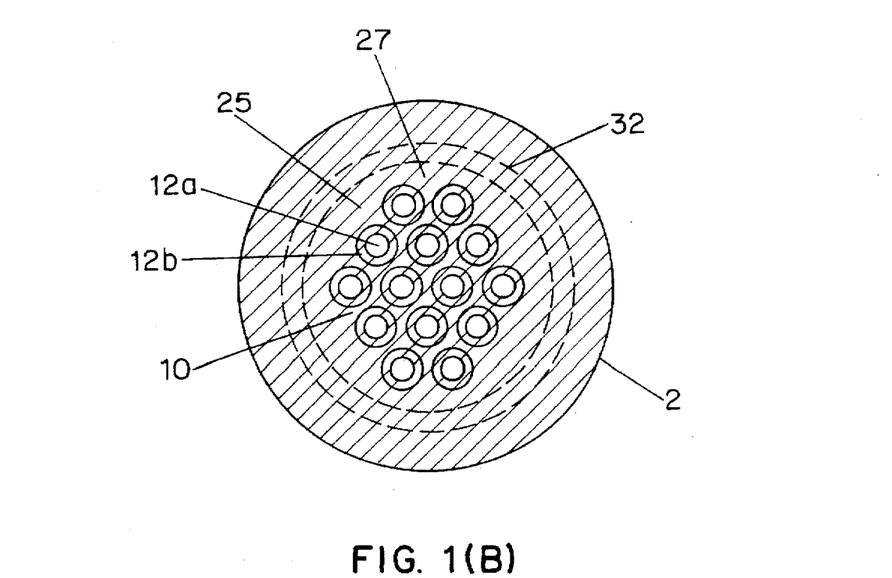
FIG. 1(B) is a side plan view of the optical star coupler of FIG. 1(A)

Referring to FIGS. 1(A) and 1(B), an optical star coupler comprises a bundling means (or bundling portion) 2 for bundling a plurality of optical fibers 11 through 24 at the first ends thereof so as to form an end face 25; a mixing means (or mixing portion) 3 including a waveguide 31 having a first end face 32, which contacts the end face 25 of the bundling means 2, and is wide enough to cover at least the cores 11a through 24a of the optical fibers 11 through 24; and a diffuser-reflector means (or diffuser-reflector portion) 4 arranged on the second end face 33 of the mixing means 3.

In this configuration shown in FIGS. 1(A) and 1(B), optical signals 6a, 6b radiate from an optical fiber and are diffused and reflected by the diffuser-reflector means 4 arranged on the second end face 33 of the mixing means 3. Though the optical signal, which radiates from an optical fiber and propagates through the mixing means 3, distributes unevenly in the cross sectional area parallel to the end faces 32, 33 of the mixing means in the conventional optical star coupler, the reflected optical signal diverges uniformly by the diffusive reflection at the diffuser-reflector means 4 in the present invention. As a result, the intensity of the light that propagates in the mixing means 3 back to the bundling means 2, distributes almost uniformly. And, the deviations in the light intensity divide ratio for each optical fibers 11 through 24 may be minimized irrespective of the displacement between the optical fibers 11 through 24 and the mixing means 3.

Figure 2A:
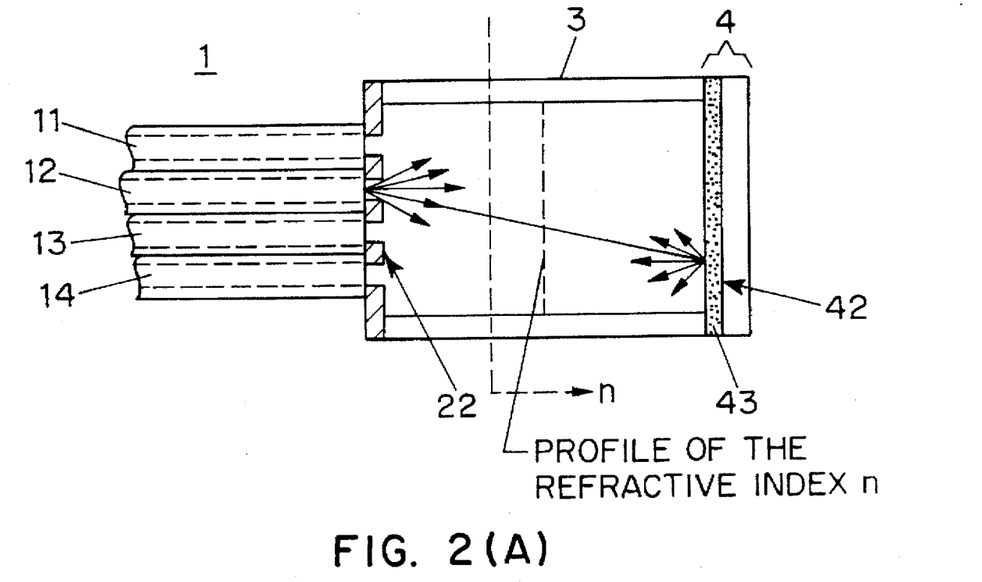
FIG. 2(A) is a cross section showing a refractive index profile across the mixing means.

FIG. 2(A) is a cross section showing a refractive index profile across the mixing means 3 and illustrates a first embodiment. The optical star coupler of the first embodiment has a step-index optical waveguide 31 that exhibits a uniform refractive index in the core thereof, as shown in FIG. 2(A). Since the refractive index n of the core 31a is higher than the refractive index of the cladding 31b (referred to in FIG. 1A), the light signals 6a, 6b propagate with a low transmission loss between the end faces 32 and 33 utilizing total reflection at the boundary between the core 31a and the cladding 31b.

Referring now back to FIGS. 1(A) and 1(B), fourteen optical fibers 11 through 24 (optical fibers 16 through 24 are not shown in FIG. 1(A)) are bundled in the bundling means 2. The mixing means 3 includes a waveguide 31 that may be a large diameter optical fiber having a core, the cross section of which is wider than the cross section of the end face 25 of the bundle of the optical fibers 11 through 24. The first end face 32 of the waveguide 31 is arranged in contact with the end face 25 of each optical fibers 11 through 24. In the illustrated embodiment, the diffuser-reflector means 4 includes a terminal mirror 41 having a flat reflection plane 42, and a light diffusion layer (either one of layer 43, 44, or 45, usually represented by 43 when it is not necessary to distinguish these three from one another) is formed on the surface of the terminal mirror 41. The reflection plane 42 is connected through the light diffusion layer 43 to the second end face 33 of the waveguide 31. The light diffusion layer 43 has minute unevenness on its surface and is made of a transparent material.

In the bundling means 2, the optical fibers 11 through 24 are bundled and fixed with adhesive filled in the space between the optical fibers. The ends of the bundled optical fibers are polished to form a flat plane 25 that contacts with the mixing means 3. A light reflector 26 (reflection plane 27) is formed on the flat plane 25 (the flat plane 25 is also referred to as "end face 25"). The light reflector 26 covers the entire surface except the end faces of the cores 11a through 24a of the optical fibers 11 through 24. In other words, the light reflector 26 covers a space 10, a hatched area including the end faces of the claddings 11b through 24b, extending between the cores 11a through 24a. (Only the reference numeral 12a designating the core of the optical fiber 12 is described in the figure.) The light reflector 26 is formed through the steps of covering the end face 25 of the bundling means 2 with a negative-type photoresist layer, exposing and developing the photoresist layer with the light beams radiated from the optical fibers to leave the photoresist layer only on the end faces of the cores 11a through 24a, depositing a metal reflection film on the end face 26 of the bundling means 2, and removing the photoresist layer deposited on the end faces of the cores 11a through 24a of the optical fibers 11 through 24.

The optical signals 6a, 6b radiate from either one of the optical fibers, e.g. the optical fiber 12, and propagate through the core 31a of the waveguide 31 to the diffuser-reflector means 4 while diverging. Then, the optical signals 6a, 6b are diffused in the diffuser-reflector means 4 by the light diffusion layer 43 and reflected by the reflection plane 42. The reflected optical signals 6a, 6b are diffused again by the light diffusion layer 43, and propagate to the end face 32. The intensity distribution of the light initially propagating in the core 31a of the waveguide 31 to the diffuser-reflector means 4 is not uniform. However, the intensity of the light twice diffused by the diffuser-reflector means 4 is equalized over the cross section of the core 31a, and uniform light intensity distribution is obtained at the end face 32 of the waveguide 31. Therefore, the intensity of the light impinging on the cores 11a through 24a of the optical fibers 11 through 24 is uniform when the end faces of the cores 11a through 24a are located inside the end face of the core 31a of the waveguide 31. Since the optical signals with uniform intensity is input to each of optical fibers 11 through 24, the intensity deviation among the distributed optical signals is minimized. The light that impinges on the light reflector 26 is reflected by the reflection plane 27 and propagates again through the waveguide 31. Thus, the optical signals 6a, 6b, once input to the waveguide 31, are reflected multiple times by the diffuser-reflector means 4 and the light reflector 26 until the optical signals 6a, 6b are ultimately inputted to the optical fibers 11 through 24, and are never radiated outside. Therefore, the optical star coupler of the invention facilitates transmitting the optical signal efficiently with low transmission loss.

Instead of arranging the reflection plane 42 and the light diffusion layer 43 separately, the optical signal may be diffused and reflected by using as the terminal mirror 41 a light diffusion layer 45 having an uneven reflection plane consisting of minute facets. Moreover, in place of locating the diffuser-reflector means 4 on the terminal mirror 41, the diffuser-reflector means 4 may be formed on the second end face 33 of the mixing means as the light diffusion layer 45 having a reflection plane with minute uneven facets. These alternatives exhibit the same effect as the above described transparent diffusion layer 43 that has minute unevenness on its surface.

The diffuser-reflector means 4 may also be formed as a light diffusion layer 44, consisting of volume holograms, disposed between the second end face 33 of the mixing means 3 and the flat reflection surface 42 of the terminal mirror 41. A volume hologram is obtained by exposing photosensitive material such as polymers to a coherent diffused light. Any hologram that exhibits desired optical diffusion characteristics may be obtained by selecting the diffusion angle range of the exposure light, light intensity distribution, wavelength, incident light angle to the photosensitive material.

Figure 2B:
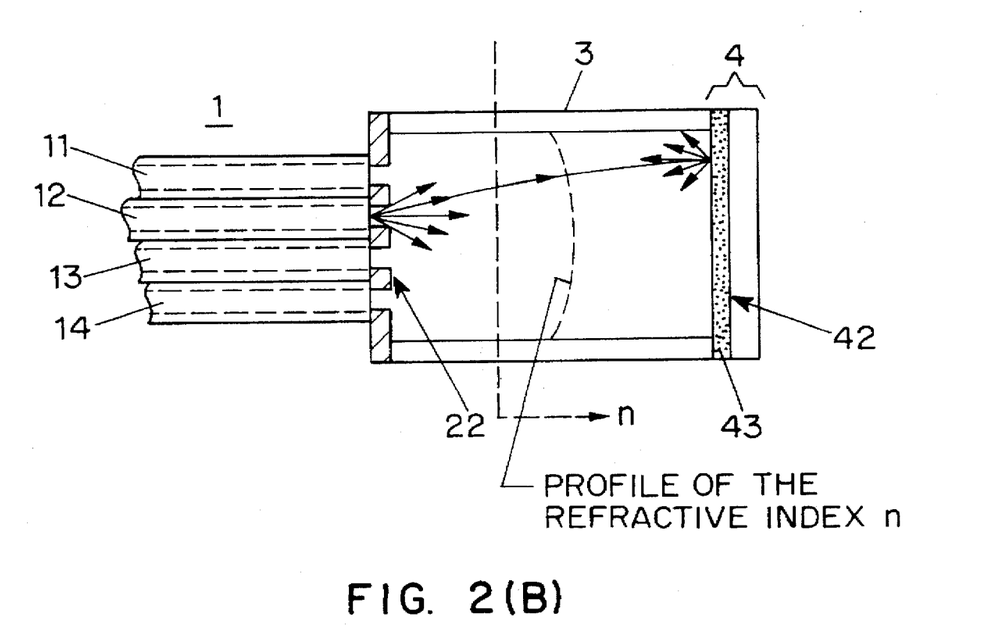
FIG. 2(B) is a cross section showing another refractive index profile across the mixing means.

In the second embodiment, the structure of the optical star coupler is the same with that of the first embodiment except for the refractive index profile of the waveguide 31 of a mixing means 3. The graded-index waveguide 31 has a refractive index profile as shown in FIG. 2(B). The refractive index is higher around the central axis of the waveguide 31 and lower in the peripheral region.

Referring now back to FIGS. 1(A) and 1(B), fourteen optical fibers 11 through 24 are bundled in a bundling means 2. The mixing means 3 including the waveguide 31 exhibits a refractive index profile that is higher around the central axis thereof. The first end 32 of the waveguide 31 is arranged in contact with the end face 25 of each of the optical fibers 11 through 24. A terminal mirror 41 having a flat reflection plane 42 is connected to the second end face 33 of the waveguide 31 through a light diffusion layer 43. A light reflector 26 (reflection plane 27) is formed on the end face 25 so as to cover the entire end face 21 except the end faces of the cores 11a through 24a of the optical fibers 11 through 24.

The refractive index distributes in rotation symmetry around the central axis of the waveguide 31. The refractive index is higher around the central axis and lower in the periphery of the waveguide 31. When the refractive index distribution in the waveguide 31 is expressed by the following equation (1), the path length of a meridional ray (the ray that propagates in a plane containing the central axis of the waveguide) is constant between the incident and exit end faces of the waveguide irrespective of its incident position and incident angle to the waveguide 31.

$$n(r)=n_o \cdot sech(a \cdot r) \tag{1}$$

Here, $n_o$ is a refractive index on the central axis, $n(r)$ is a refractive index at a position apart by a distance r from the central axis, and constant a is a distribution constant.

When the refractive index distribution in the waveguide 31 is expressed by the following equation (2), the path length of a spiral ray (the ray that propagates spirally around the central axis of the waveguide) is constant between the incident and exit end faces of the waveguide irrespective of its incident position and incident angle to the waveguide 31.

$$n(r)=n_o \cdot [1+(a \cdot r)^2]^{1/2} \tag{2}$$

Equations (1) and (2) may be approximated by equation (3) when the higher order terms including the term $(a \cdot r)^4$ in an expanded power series may be neglected.

$$n(r)=n_o \cdot [1-(a \cdot r)^2/2] \tag{3}$$

Therefore, when the refractive index distributes radially from the central axis of the waveguide 31 and the higher order terms including the term $(a \cdot r)^4$ may be neglected, the path length is nearly constant for any ray that propagates between the incident and exit end faces of the waveguide irrespective of its incident position and incident angle to the waveguide 31.

Figure 4:
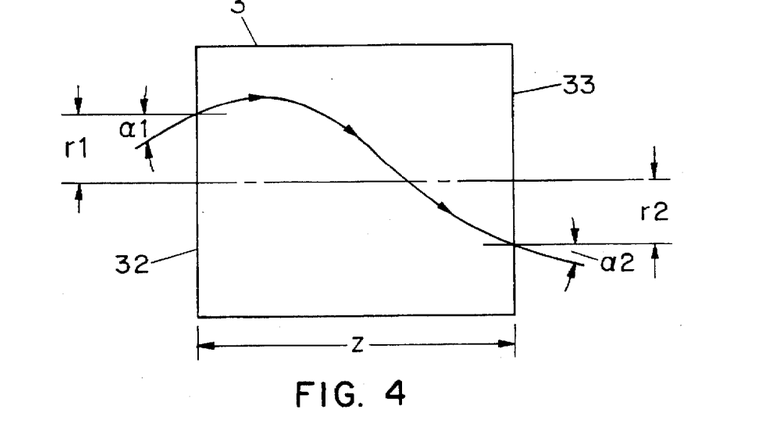
FIG. 4 is a trace of incident and radiated light across a graded-index optical waveguide of the invention.

The trace T shown in FIG. 4 of a meridional ray that propagates in a waveguide having a refractive index profile expressed by equation (3) is expressed by equation (4) that relates the spacing z between an incident end face 32 and exit end face 33; i.e. the length of the waveguide 31, the position r1 of the ray at the incident end face 32, the incident angle α1 of the ray to the incident end face 32, the position r2 of the ray at the exit end face 33, and the radiation angle α2 of the ray to the exit end face 33.

$$r2=r1 \cdot cos\ (a \cdot z)+[\alpha 1/(n_o \cdot a)] \cdot sin\ (a \cdot z),\ \alpha 2=-r1 \cdot n_o \cdot a \cdot sin\ (a \cdot z)+\alpha 1 \cdot cos\ (a \cdot z) \tag{4}$$

Especially when $z=\pi/(2a)$, the relation of the incident and radiated rays is expressed from equation (4) by equation (5).

$$r2=\alpha 1/(n_o \cdot a),\ \alpha 2=-r1 \cdot n_o \cdot a \tag{5}$$

When equation (5) holds, a ray that passes a point r1 on the incident end face 32 of the waveguide 31 is radiated at an radiation angle α2 from the exit end face 33, and the exit position r2 varies depending on the incident angle α1.

The waveguide 31 used in the second embodiment has a refractive index profile expressed by equation (3), and has the length of $\pi/(2a)$. Therefore, the above described equation (5) holds for the waveguide 31 of the second embodiment.

The diffuser-reflector means 4 in the second embodiment includes a light diffusion layer 44 comprised of many minute volume holograms, and a terminal mirror 41 having a reflection plane 42. Each of the minute holograms are formed by periodically changing the refractive index of a transparent medium. The volume hologram intensely diffracts a ray having a specific wavelength and which impinges at a specific incident angle on the hologram. This specific condition is called the Bragg condition expressed by equation (6).

$$\kappa d=\kappa i+\beta \tag{6}$$

Here, κi and κd are an incident wave vector and a diffracted wave vector, respectively, and the directions thereof coincide with the propagation directions of the incident ray to the hologram and the diffracted ray diffracted by the hologram. The magnitude of the wave vector is $2\pi/\lambda$ for a wavelength λ. β represents a grating vector, the direction of which coincides with the normal line to the iso-refractive index surface of the hologram and the magnitude thereof is $2\pi/p$ for the length p of one cycle of refractive index change in the hologram. Therefore, a pair of an incident ray and a diffracted ray that satisfies the Bragg condition exists for each minute holograms. Since the medium of the holograms is transparent, the rays which do not satisfy the Bragg condition pass through the minute holograms.

An incident ray to the diffuser-reflector means 4 passes through the minute holograms and is diffracted by a minute hologram that satisfies the Bragg condition. The diffracted rays diffracted by many holograms are radiated from the light diffusion layer 44 as a diffused light in total. An incident ray that has impinged on the diffuser-reflector means at another incident angle is diffracted by another minute hologram located in the propagation direction of the incident ray.

In the diffusion layer 44, the minute holograms are oriented at the same ratio to all the directions within the predetermined incident angle range described later so that the diffraction may occur evenly for all the pairs of the incident and diffraction directions. Therefore, an incident ray, the incident angle thereof to the light-diffusion layer 44 is within the predetermined angle range, may be diffused uniformly to all the directions within the predetermined angle range. The predetermined angle corresponds to the incident angle for the ray radiated from the outermost optical fiber, for that incident angle the incident ray may reach the light diffusion layer 44.

Figure 3A:
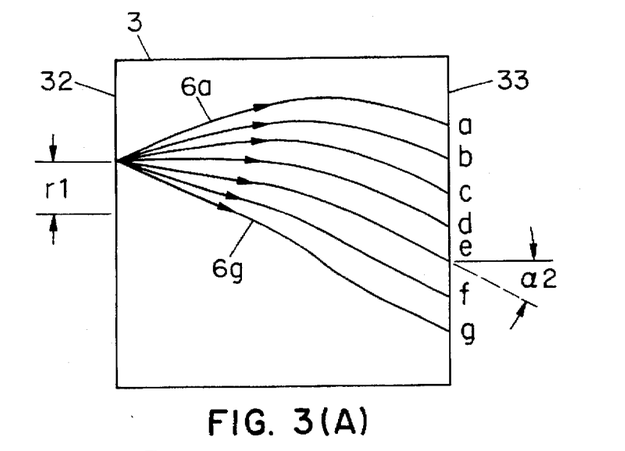
FIG. 3(A) is a set of ray traces for explaining the propagation characteristics of an optical signal light through a graded-index optical waveguide.
Figure 3B:
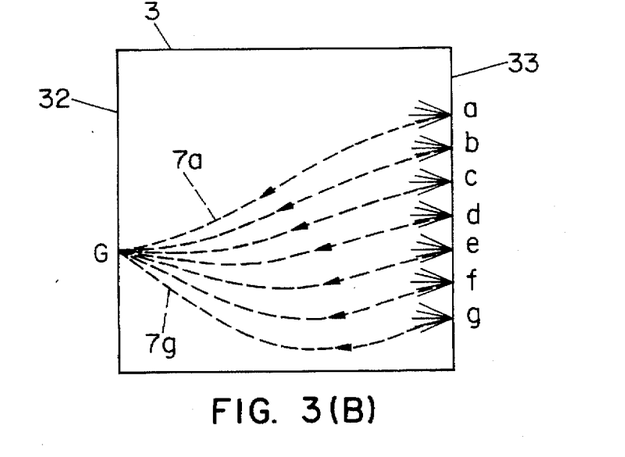
FIG. 3(B) is another set of ray traces for explaining the propagation characteristics of an optical signal light through a graded-index optical waveguide.

The optical star coupler of the second embodiment works in the following manner. In FIGS. 3(A) and 3(B), the optical signals 6a through 6g radiate from any one of the not shown optical fibers, e.g. an optical fiber 12, propagate while refracted, and reach the light diffusion layer 44 that is in contact with the end face 33. Since the relation (5) holds in the graded-index waveguide 31 of the second embodiment, the radiated ray directions from the end face 33, i.e. the incident ray direction to the light diffusion layer 44, is the predetermined angle $\alpha 2$ corresponding to the distance r1 between the core 12a of the optical fiber 12 and the central axis of the waveguide 31. Since FIG. 3(A) shows only the traces of the ray radiated from a point on the end of the core 12a at the angles determined by the numerical aperture (NA) of the optical fiber 12, the radiation angle of the ray from the end face 33 is the constant $\alpha 2$. The incident ray to the light diffusion layer 44 is diffused uniformly in all the directions within the predetermined angle range. The predetermined angle is set at the incident angle for the ray radiated from the outermost optical fiber, so that the incident ray from all the optical fibers may reach the light diffusion layer 44 and be within that selected angle.

The diffused rays from the light diffusion layer 44 are reflected by the reflection plane not shown in FIGS. 3(A) and 3(B), diffused again by the light diffusion layer 44, and impinge upon the illustrated continuous area a through g of end face 33 of the waveguide 31. The incident direction (re-entrant direction) distributes uniformly within the above described angle range defined by the light diffusion layer 44. Equation (5) holds also for the re-entrant rays, and the maximum re-entrant angle to the end face 33 corresponds to the position of the outermost optical fiber. Therefore, the optical signals 7a through 7g, which have propagated through the waveguide 31, focus at a point G, corresponding to the same re-entrant angle to the end face 33, on the end face 32. In total, the light reflected back distributes uniformly on the end face 32 within a circle, the radius thereof corresponds to the distance between the central axis of the waveguide 31 and the outermost optical fiber. Thus, each intensity of light that reaches the cores 11a through 24a of each optical fibers is equalized. Since the light, which has reached the cores 11a through 24a, propagates through the optical fibers 11 through 24, any deviation is not caused in the distribution ratio for each incident optical signals and for each distributed optical signals.

The light that impinges on the light reflector 26 is reflected by the reflection plane 27 and propagates again through the waveguide 31. Thus, the optical signals, once input to the waveguide 31, are reflected many times by the diffuser-reflector means 4 and the light reflector 22 until the optical signals are input to the optical fibers 11 through 24, and never are radiated outside. Therefore, the optical star coupler of the invention facilitates transmitting the optical signal efficiently with low loss.

In the bundling means 2 of the second embodiment, the optical fibers 11 through 24 are bundled and fixed with adhesive filled in the space between the optical fibers. The light reflector 26 is formed through the steps of: covering the end face 25 of the bundling means 2 with a negative-type photoresist layer; exposing and developing the photoresist layer with the light beams radiated from the optical fibers to leave the photoresist layer only on the end faces of the cores 11a through 24a; depositing a metal reflection film on the end face 21 of the bundling layer 2; and removing the photoresist film deposited on the end faces of the cores 11a through 24a of the optical fibers 11 through 24.

The graded-index waveguide 31 is fabricated by the steps of forming a circular optical glass rod doped with univalent ions, which exhibit large electronic polarizability and migrate easily in the glass at high temperature, and immersing the glass rod in a molten salt to exchange the doped ions and the alkaline ions contained in the molten salt and to obtain the desired refractive index distribution based on the quasi-parabolic distribution of the diffused alkaline ions.

An aggregate of the minute holograms that constitute the light diffusion layer 44 is obtained by irradiating a coherent diffused light on a photosensitive material, e.g. polymer, the refractive index of which changes with the exposure light intensity. Since the light intensity distribution on the interference fringes, which is formed by two light bundles which cross one another in the exposed photosensitive material, is stored as a hologram, the incident and diffracted light pair that satisfies the Bragg condition coincides with the light bundle pair irradiated on the photosensitive material. Therefore, by equalizing the intensity distribution of the diffused light irradiated on the photosensitive material within the predetermined angle range required to the light diffusion layer 44, the intensity of any interference fringes formed by two crossing light bundles may be modulated at the same magnitude for any combinations of two directions within the predetermined angle range. Thus, the light diffusion layer 44 that exhibits the above described function is obtained.

In the embodiments described above, the length of the graded-index optical waveguide is set at $\pi/(2a)$. When the length z of the waveguide, having the same refractive index distribution, is expressed by the following equation (7), the incident ray direction from the second end face of the waveguide may be changed in response to the incident position of the ray at the first end face of the waveguide.

$$z = (2N+1) \cdot \pi/(2a) \tag{7}$$

where N is a positive integer.

In the embodiments described above, a hologram that transmits and diffuses the incident light is used in the waveguide 31. Alternatively, a hologram that reflects and diffuses the incident light may be used in the light diffusion layer 44.

As has been explained above, the present invention equalizes the intensity distribution of the optical signal light that propagates through the mixing means by forming a light diffusion means on the reflection plane of the terminal mirror. As a result, the distribution ratios of the light radiated from an optical fiber and the incident light to the other optical fibers do not have a layer deviation from one another even when each optical fibers are displaced to some extent from the mixing means.

Since the incident optical signal light from either one of the optical fibers to the waveguide is diffused in the light diffusion layer and the diffused light propagates back to the incident end face of the waveguide, the light intensity distribution at the incident end face of the waveguide is equalized and made uniform. Therefore, the distribution ratios of the light radiated from an optical fiber and the incident light to the other optical fibers have a limited deviation from one another even when each optical fibers are displaced to some extent from the mixing means.

By the provision of the light reflector on the contact faces of the mixing means and the bundling means except on the end faces of the cores of the optical fibers, the optical signals input to the mixing means are reflected many times until the optical signals are coupled to the optical fibers and are never radiated outside. Thus, the optical signals are efficiently transmitted.

As a result, an optical star coupler is obtained which improves the spacing factors of the optical fibers and mixing means, and which distributes the optical signal radiated from an optical fiber uniformly across the mixing means and couples the distributed optical signal efficiently to the other optical fibers.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

I claim:

1. An optical star coupler comprising:

a bundling portion comprising a plurality of optical fibers each including a first and second end and a core, wherein said first ends of said optical fibers are bundled and said first ends of said optical fibers' faces are formed to be a flat plane;

a mixing portion comprising a waveguide including a first and second end face, wherein said first end face of said waveguide is coupled to said flat plane of said bundling portion and covers said cores of said optical fibers; and a diffuser-reflector portion coupled to said second end face of said waveguide, wherein said diffuser-reflector portion comprises a terminal mirror including a reflection plate and a transparent light diffusion layer formed between said second end face of the waveguide and said reflection plate of said terminal mirror.

2. The optical star coupler of claim 1 wherein said light diffusion layer comprises volume holograms.

3. An optical star coupler comprising:

a means for bundling a plurality of optical fibers, at least one of said optical fibers carrying a transmission signal;

a means for mixing at least one signal from said optical fibers, wherein said mixing means is coupled to said bundling means and a means for diffusing said at least one transmission signal and for reflecting said at least one transmission signal back to said bundling means, wherein said diffusing and reflecting means is coupled to said mixing means, wherein said diffusing and reflecting means comprises a terminal mirror including a reflection plate and a transparent light diffusion layer formed between one end of said mixing means and said reflection plate of said terminal mirror.

4. The optical star coupler of claim 3 wherein said light diffusion layer comprises volume holograms.

\* \* \* \* \*